(12) United States Patent
Su et al.

(10) Patent No.: US 11,480,835 B2
(45) Date of Patent: Oct. 25, 2022

(54) ELECTRONIC DEVICE AND FABRICATION METHOD OF THE SAME

(71) Applicant: AU OPTRONICS CORPORATION, Hsin-Chu (TW)

(72) Inventors: Chih-Chung Su, Hsin-Chu (TW); Yi-Wei Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/878,806

(22) Filed: May 20, 2020

(65) Prior Publication Data

US 2021/0033935 A1 Feb. 4, 2021

(30) Foreign Application Priority Data

Jul. 30, 2019 (TW) ................................ 108127046
Jan. 8, 2020 (TW) ................................ 109100652

(51) Int. Cl.
*G02F 1/1362* (2006.01)
*G02F 1/1335* (2006.01)
*G02F 1/1333* (2006.01)

(52) U.S. Cl.
CPC .. *G02F 1/136213* (2013.01); *G02F 1/133512* (2013.01); *G02F 1/133388* (2021.01)

(58) Field of Classification Search
CPC .............................................. G02F 1/136213
See application file for complete search history.

(56) References Cited

U.S. PATENT DOCUMENTS

| | | | |
|---|---|---|---|
| 2009/0302325 A1* | 12/2009 | Huh | ............... H01L 27/1251 257/72 |
| 2013/0258234 A1 | 10/2013 | Park et al. | |
| 2014/0063407 A1 | 3/2014 | Kwon et al. | |
| 2017/0012064 A1 | 1/2017 | Choi et al. | |
| 2019/0384121 A1* | 12/2019 | Nishiwaki | ......... G02F 1/133512 |
| 2020/0174301 A1* | 6/2020 | Tien | ............... H04M 1/0264 |
| 2020/0285123 A1* | 9/2020 | Kim | ............... H01L 25/0753 |
| 2021/0359063 A1* | 11/2021 | Lu | ............... H01L 27/3265 |

FOREIGN PATENT DOCUMENTS

| | | |
|---|---|---|
| CN | 103676332 A | 3/2014 |
| CN | 107946341 A | 4/2018 |
| CN | 109445195 A | 3/2019 |
| TW | M342517 U | 10/2008 |

* cited by examiner

*Primary Examiner* — Edmond C Lau
(74) *Attorney, Agent, or Firm* — WPAT, PC

(57) ABSTRACT

An electronic device includes a first substrate, a second substrate, a buffer layer, an active array, a pixel array, a protection layer and an alignment film. The first substrate includes a transmission region, a display region, and a periphery region. The periphery region surrounds the display region, and the display region surrounds the transmission region. The first substrate is disposed opposite to the second substrate. The buffer layer is disposed on the second substrate. The protection layer is disposed on the buffer layer, and a projection of the protection layer on the second substrate is apart from the transmission region. The active array is disposed on the buffer layer. The pixel array is disposed on the active array and is electrically connected to the active array. The alignment film is conformally disposed on the protection layer, the buffer layer, and the second substrate.

8 Claims, 25 Drawing Sheets

ELECTRONIC DEVICE AND FABRICATION METHOD OF THE SAME

RELATED APPLICATIONS

This application claims priority to Taiwan Application Serial Number 108127046, filed Jul. 30, 2019, and Taiwan Application Serial Number 109100652, filed Jan. 8, 2020, which are herein incorporated by references.

BACKGROUND

Technical Field

The present disclosure relates to an electronic device.

Description of Related Art

High screen-to-body ratio has been a standard of the mobile phone nowadays except for power saving and high quality. Therefore, how to reduce the area occupied by other functions has been a developing direction for increasing the screen-to-body ratio. For example, regarding the holes for depositing the front camera and the sensor, the available method is to drill a hole such that the front camera and the sensor can be put into the hole. However, this method requires glass drilling process and sealing process around the holes. As a result, the fabrication cost is increased and the yield is decreased.

SUMMARY

One aspect of the present disclosure is an electronic device.

According to some embodiments of the present disclosure, an electronic device includes a first substrate, a second substrate, a buffer layer, a protection layer, an active array, a pixel array, and an alignment film. The first substrate includes a transmitting region, a display region, and a periphery region. The periphery region surrounds the display region, and the display region surrounds the transmission region. The second substrate is disposed opposite to the first substrate. The buffer layer is disposed on the second substrate. The protection layer is disposed on the buffer layer. A projection of the protection layer on the second substrate is apart from the transmitting region. The active array is disposed on the buffer layer. The pixel array is disposed on the active array and electrically connected to the active array. The alignment film is conformally disposed on the protection layer, the buffer layer, and the second substrate.

In some embodiments, the alignment film includes a first portion and a second portion, a projection of the first portion on the second substrate is overlapped with the display region, a projection of the second portion on the second substrate is overlapped with the transmitting region, and a distance between the first portion and the second substrate is greater than a distance between the second portion and the second substrate.

In some embodiments, a projection of the buffer layer on the second substrate is apart from the transmitting region.

In some embodiments, a thickness of the buffer layer is greater than 1500 angstroms and is smaller than and equal to 3000 angstroms.

In some embodiments, the buffer layer further includes a first sub-layer and a second sub-layer. The first sub-layer has a thickness greater than and equal to 500 angstroms and is smaller than and equal to 1350 angstroms, and a material of the first sub-layer comprises silicon nitride. The second sub-layer has a thickness greater than and equal to 1000 angstroms and is smaller than and equal to 1650 angstroms, and a material of the second sub-layer comprises silicon oxide.

In some embodiments, the buffer layer includes a first portion and a second portion, a projection of the first portion on the second substrate is overlapped with the display region, a projection of the second portion on the second substrate is overlapped with the transmitting region, and a thickness of the second portion is smaller than a thickness of the first portion.

In some embodiments, a refractive index of the buffer layer is greater than 1.48 and is smaller than 1.6, and an extinction coefficient is greater than 0 and is smaller than $10^{-3}$.

In some embodiments, a refractive index of the buffer layer is greater than 1.6, and an extinction coefficient is greater than $10^{-3}$.

In some embodiments, a total thickness of the second portion of the buffer layer and the alignment film is greater than and equal to 500 angstroms and is smaller than and equal to 1000 angstroms.

In some embodiments, the electronic device includes an imaging element facing the second substrate, and an orthogonal of the imaging element on the second substrate is overlapped with the transmitting region.

In some embodiments, the electronic device further includes a sensor facing the second substrate, and an orthogonal of the sensor on the second substrate is overlapped with the transmitting region.

Another aspect of the present disclosure is fabrication method of electronic device.

In some embodiments, the fabrication method of electronic device includes forming a buffer layer on a second substrate; forming an active array, a pixel array, and a protection layer on the buffer layer; forming an opening in the buffer layer; forming an alignment film on the pixel array and the opening; and filling a liquid crystal layer between a first substrate and the second substrate.

In some embodiments, the opening is formed in the protection layer and the buffer layer.

In some embodiments, forming the active array and the pixel array and forming the opening are performed simultaneously.

In some embodiments, the alignment film is conformally formed on the protection layer and the buffer layer.

In some embodiments, forming the buffer layer on the second substrate further includes a thickness of the buffer layer is greater than and equal to 1500 angstroms and is smaller than and equal to 3000 angstroms, and forming the opening in the buffer layer such that the second substrate is exposed from the opening.

In some embodiments, forming the alignment film on the pixel array and the opening such that the alignment film is in contact with the second substrate.

In some embodiments, a refractive index of the buffer layer is greater than 1.48 and is smaller than 1.6, and an extinction coefficient of the buffer layer is greater than 0 and is smaller than $10^{-3}$.

In some embodiments, forming the opening in the buffer layer such that a portion of the buffer layer is located between the opening and the second substrate, and forming the alignment film on the buffer layer such that the alignment film is in contact with the portion of the buffer layer.

In some embodiments, forming the opening in the buffer layer and forming the alignment film on the buffer layer such that a total thickness of a portion of the alignment film in the opening and the portion of the buffer layer is greater than and equal to 500 angstroms and is smaller than and equal to 1000 angstroms, and a refractive index of the buffer layer is greater than 1.6, and an extinction coefficient of the buffer layer is greater than $10^{-3}$.

According to the foregoing embodiments, through the design of the laminated structures at the side containing arrays, the projection of the protection layer on the second substrate can be spaced apart from the transmission region TR. In addition, the alignment film can be conformally formed on the protection layer, the buffer layer, and the second substrate, thereby increasing the light transmittance of the transmission region and reducing the difference of the light transmittance. In addition, since there is no need to form the transmission region TR by drilling process, the process of forming the transmission region may be integrated with the process of forming the panel. Therefore, the fabrication cost may be reduced and the yield may be increased.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
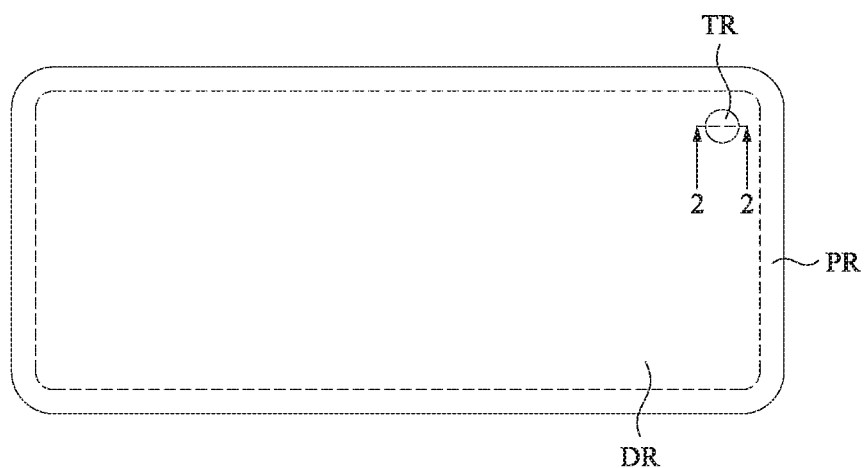
FIG. 1 is a top view of an electronic device according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
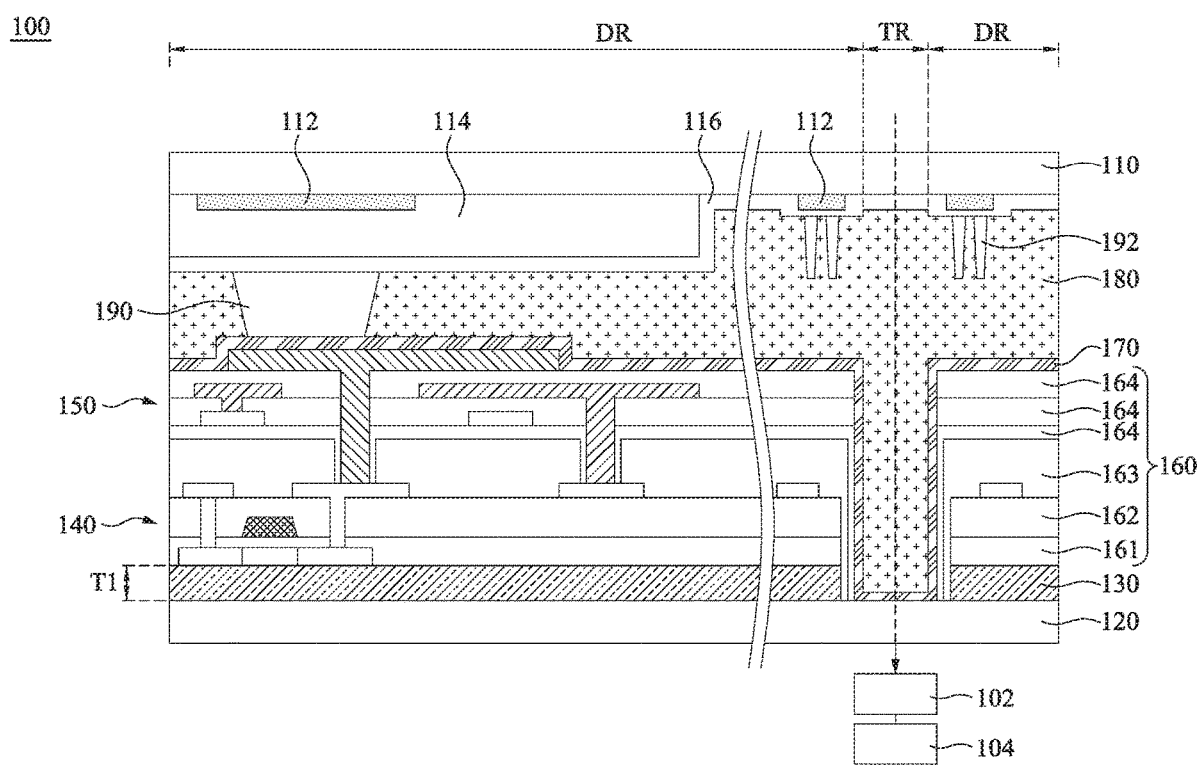
FIG. 2 is a cross-sectional view taken along line 2-2 in FIG. 1.

FIG. 1 is a top view of an electronic device 100 according to one embodiment of the present disclosure. FIG. 2 is a cross-sectional view taken along line 2-2 in FIG. 1. Reference is made to FIG. 1 and FIG. 2 simultaneously. The electronic device 100 includes a first substrate 110, a second substrate 120, a buffer layer 130, a pixel array 150, an active array 140, a protection layer 160, and an alignment film 170. The first substrate 110 includes a periphery region PR, a display region DR, and a transmitting region TR. The periphery region PR surrounds the display region DR, and the display region DR surrounds the transmission region TR. For clarity and simplicity, only the display region DR and the transmission region TR are illustrated in the subsequent cross-sectional views, and the periphery region TR is omitted. The second substrate 120 is disposed opposite to the first substrate 110. The first substrate 110 and the second substrate 120 may be transparent glass cover, and there is no through hole in the transmission region TR. That is, the first substrate 110 and the second substrate 120 are formed as a single piece and extend from the periphery region PR to the display region DR and the transmission region TR. The buffer layer 130 is disposed on the second substrate 120. The protection layer 160 is disposed on the buffer layer 130, and a projection of the protection layer 160 on the second substrate 120 is apart from the transmitting region TR. The active array 140 is disposed on the buffer layer 130. The pixel array 150 is disposed on the active array 140 and electrically connected to the active array 140. The protection layer 160 includes a plurality of layers, and the active array 140 and the pixel array 150 are disposed in the protection layer 160. In other words, the protection layer 160 is formed simultaneously with formation of the active array 140 and the pixel array 150. Detail structure of the protection layer 160 will be described in subsequent paragraphs. An orthogonal projection of the protection layer 160 on the second substrate 120 is spaced apart from the transmission region TR, and the alignment film 170 is conformally disposed on the protection layer 160, the buffer layer 130, and the second substrate 120.

The electronic device 100 further includes a liquid crystal layer 180, and imaging element 102, and/or a sensor 104. The present embodiment includes an imaging element 102 and a sensor 104, but it is not limited in this regard. In some other embodiments, there may be only the imaging element 102 or the sensor 104. The liquid crystal layer 180 is located between the first substrate 110 and the second substrate 120. The imaging element 102, and/or the sensor 104 faces the second substrate 120, and orthogonal projections of the imaging element 102 and the sensor 104 on the second substrate 120 are overlapped with the transmission region TR. In other words, the orthogonal projections of the imaging element 102 and the sensor 104 on the second substrate 120 are spaced apart from the orthogonal projections of the protection layer 160 on the second substrate 120. The imaging element 102, and/or the sensor 104 is configured to receive a portion of a light passed the transmission region TR of the first substrate 110, and the portions of the alignment film 10 and the first substrate 110 that are overlapped with the transmission region TR. The imaging element 102, for example, may be a front lens, and the sensor 104 may be ambient light sensor. In addition, the imaging element 102 is disposed on the sensor 104 in FIG. 2, but the present disclosure is not limited in this regard. In some other embodiments, the imaging element 102 and the sensor 104 may be disposed horizontally, or the sensor 104 may be disposed on the imaging element 102.

Figure 3:
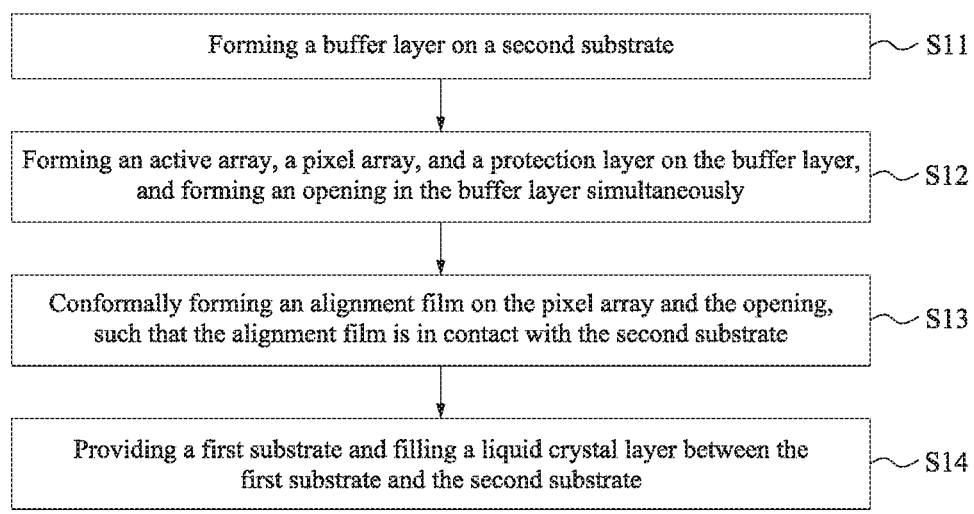
FIG. 3 is a flow chart of a fabrication method of the electronic device in FIG. 1.
Figure 4A:
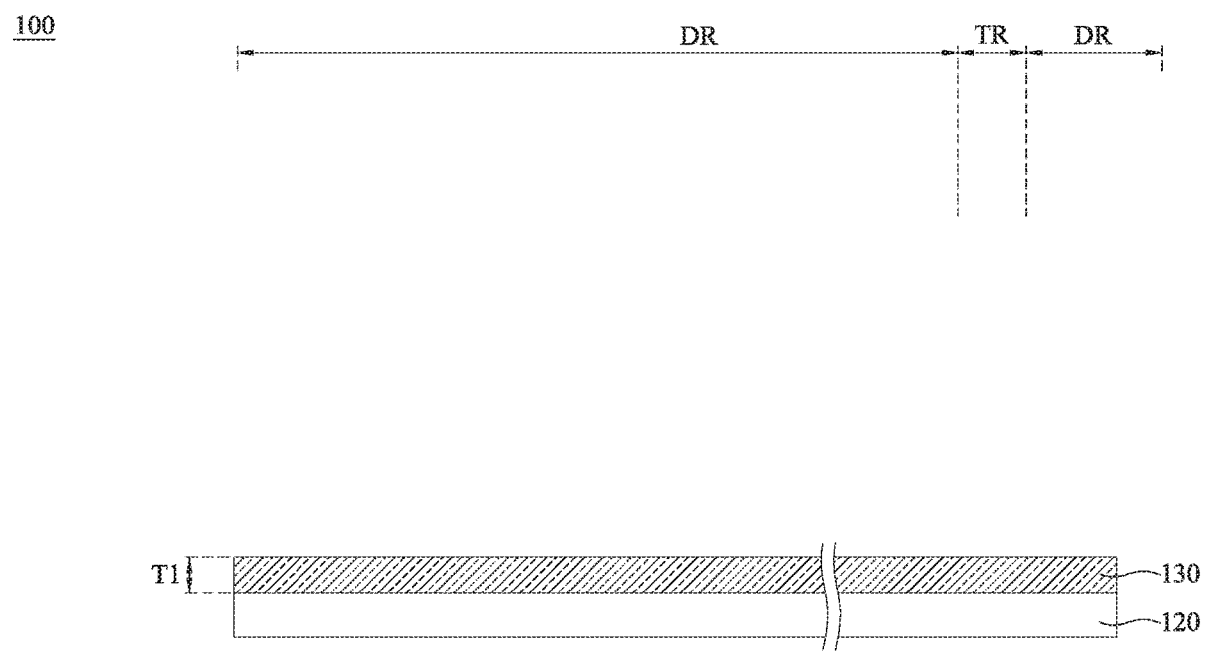
FIGS. 4A to 4E are cross-sectional views of different stages of the fabrication method of the electronic device in FIG. 1.

FIG. 3 is a flow chart of a fabrication method of the electronic device 100 in FIG. 1. FIGS. 4A to 4E are cross-sectional views of different stages of the fabrication method of the electronic device 100 in FIG. 1. FIGS. 4A to 4E have the same cross-section location as FIG. 2. For clarity, the display region DR and the transmission region TR are illustrated corresponds to FIG. 2, and the periphery region PR is omitted. Reference is made to FIG. 3 and FIG. 4A, in step S11, providing the second substrate 120, and forming the buffer layer 130 on the second substrate 120. The buffer layer 130 extends and covers onto the second substrate 120, and the buffer layer 130 is overlapped with the display region DR and the transmission region TR. In the present embodiment, a material of the buffer layer 130 may be any material suitable for forming the buffer layer. A thickness T1 of the buffer layer 130 is greater than and equal to 1500 angstroms (Å), and is smaller than or equal to 3000 angstroms. The thickness T1 of the buffer layer 130 may be achieved through adjusting process parameter. As an example, by adjusting a deposition time.

Figure 4B:
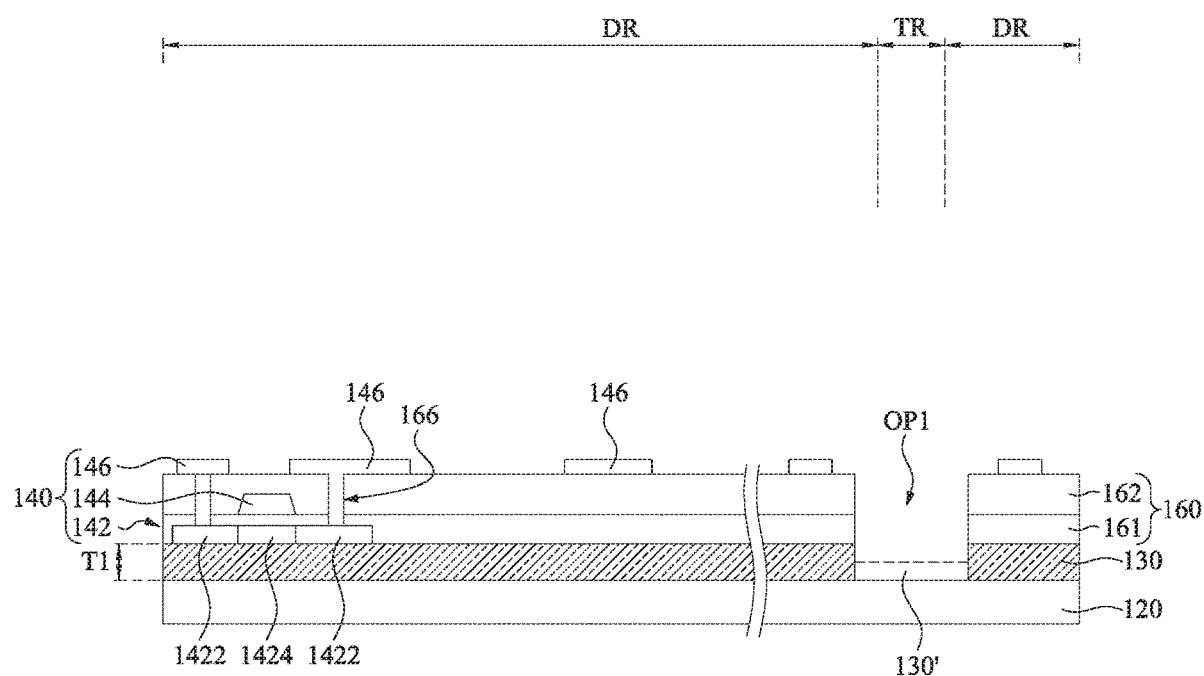

Reference is made to FIG. 3 and FIG. 4B simultaneously, in step S12, forming the active array 140, the pixel array 150, and the protection layer 160 on the buffer layer 130. The active array 140 includes a semiconductor layer 142 and a gate electrode 144. In the present embodiment, the active array 140 may be a low temperature poly-silicon thin film transistor (LTPS), and the semiconductor layer 142 may be poly-silicon, but the present embodiment is not limited in this regard. The semiconductor layer 142 is formed on the buffer layer 130 through patterning, and the gate insulation layer 161 covers the semiconductor layer 142. The gate electrode 144 is formed on the gate insulation layer 161 through patterning. The semiconductor layer 142 is doped to form a source/drain region 1422. A portion of the semiconductor layer 142 underlying the gate electrode 144 is the channel region 1424. An interlayer dielectric layer 162 is formed on the gate insulation layer 161 and covers the gate electrode 144. Continuously, forming contact opening 166 in the gate insulation layer 162 and the interlayer dielectric layer 162, and forming a contact metal layer 146 in the contact opening 166 and on the interlayer dielectric layer 162 by patterning after depositing contact metal material so as to electrically connect the contact metal layer 146 with the source/drain region 1422, respectively.

Specifically, in the aforementioned patterning process of forming the active array 140, the portions of the gate insulation layer 161 and the interlayer dielectric layer 162 that are overlapped with the transmission region TR are etched by adjusting design of the photomask. In addition, a portion of the buffer layer 130 underlying the gate insulation layer 161 and the interlayer dielectric layer 162 that is overlapped with the transmission region TR may be partially etched during the process of patterning. For example, when forming the contact opening 166 in the gate insulation layer 161 and the interlayer dielectric layer 162, the portion of the buffer layer 130 overlapped with the transmission region TR may also be removed. Or, the portion of the buffer layer 130 overlapped with the transmission region TR may also be partially etched when patterning the contact metal layer 146. As shown in FIG. 4B, a buffer layer 130' represents a remaining portion of the portion of the buffer layer 130 overlapped with the transmission region TR after being etched. In other words, an opening OP1 is formed in the buffer layer 130, the gate insulation layer 161, and the interlayer dielectric layer 162 in the process of forming the active array 140 simultaneously. The layers corresponding to the transmission region TR are formed in the opening OP1 as shown in FIG. 2 in the subsequent steps.

Figure 4C:
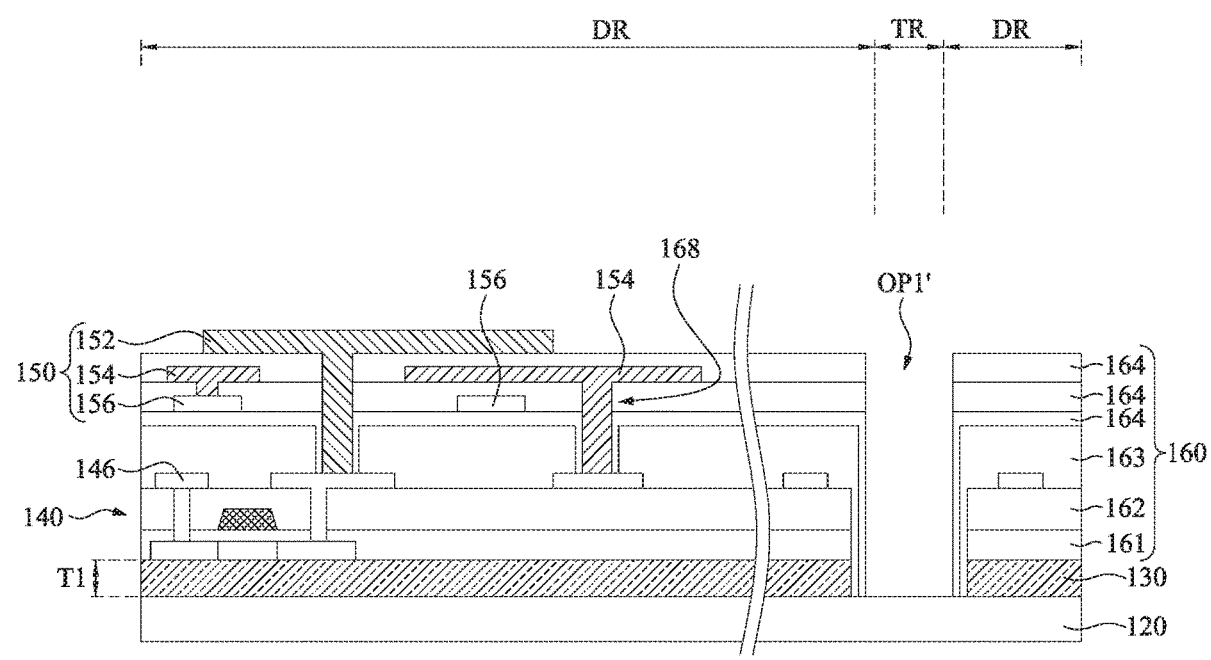

Reference is made to FIG. 3 and FIG. 4C, forming the pixel array 150 on the buffer layer 130 and the active array 140. In the present embodiment, the pixel array 150 includes a first electrode 152, a second electrode 154, and a metal circuit layer 156. The protection layer 160 includes a gate insulation layer 161, an interlayer dielectric layer 162, a passivation layer 163, and a plurality of insulation layers 164. The passivation layer 163 covers the contact metal layer 146. The insulation layer 164 and the metal circuit layer 156 are formed on the passivation layer 163 through patterning process, and the metal circuit layer 156 is formed between the insulation layers 164. A plurality of contact openings 168 are formed in the passivation layer 163 and the insulation layers 164. The first electrode 152 is located on the insulation layer 164, and is electrically connected to the contact metal layer 146 by penetrating the passivation layer 163 and the insulation layer 164 through the conductive through hole, and then is electrically connected to the source/drain region 1422. The second electrode 154 is located in the insulation layer 164 and is electrically connected to the metal circuit layer 156 or the contact metal layer 146 by penetrating the insulation layer 164 through the conductive through hole. For example, in some embodiments, the first electrode 152 is a pixel electrode, and is formed by transparent conductive material. The second electrode 154 is formed by transparent conductive material and is electrically connected to another electrode and the first electrode 152 through metal circuit layer 156 to form a storage capacitor, but the present embodiment is not limited in this regard.

Similarly, in the aforementioned patterning process of forming the pixel array 150, the portions of the passivation layer 163 and the insulation layer 164 that are overlapped with the transmission region TR are etched by adjusting design of the photomask. For example, when forming the contact opening 168 in the passivation layer 163 and the insulation layer 164, the portion of the buffer layer 130' overlapped with the transmission region TR may also be partially removed or completely removed. Or, the portion of the buffer layer 130' overlapped with the transmission region TR may also be etched when patterning the first electrode 152 and the second electrode 154. The second substrate 120 will be exposed from the opening OP1' during plural patterning processes after the pixel array 150 is formed. In other words, the opening OP1' maybe formed in the buffer layer 130, the gate insulation layer 161, and the interlayer dielectric layer 162 in the process of forming the pixel array 150 simultaneously, and the opening OP1' may penetrate the protection layer 160 and the buffer layer 130. That is, the opening OP1 as shown in FIG. 4B is deepened so as to penetrate the buffer layer 130.

Through step S12, by adjusting the thickness T1 (see FIG. 4A) to be greater than and equal to 1500 angstroms and is smaller than and equal to 3000 angstroms, the portion of the buffer layer 130 overlapped with the transmission region TR may be completely removed after the active array 140 and the pixel array 150 are formed. In some embodiment, the portion of the buffer layer 130 overlapped with the transmission region TR may also be completely removed after the active array 140 is formed. In other words, the active array 140 and the pixel array 150 may be formed as long as the second substrate 120 is exposed from the opening OP1'. In addition, since the opening OP1 and the opening OP1' are formed during forming the active array 140 and the pixel array 150, there is no need to increase numbers of the photomask and the process step.

Figure 4D:
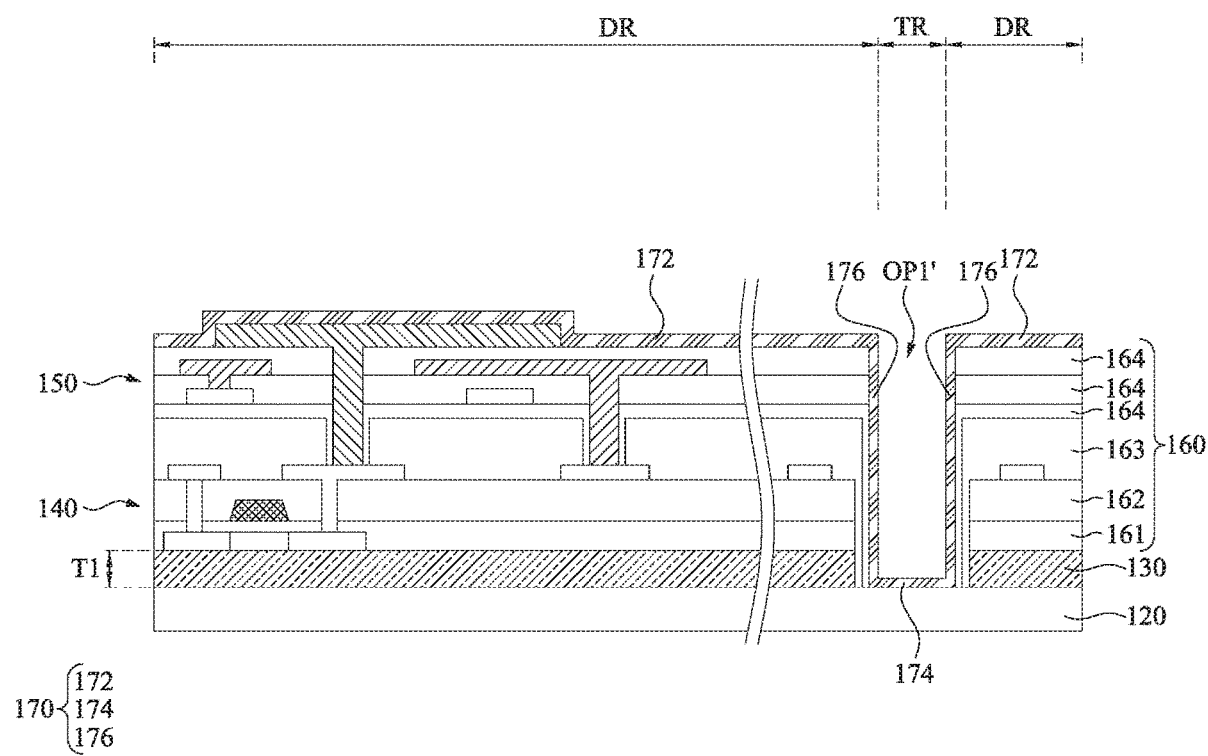

Reference is made to FIG. 3 and FIG. 4D simultaneously, in step S13, conformally forming the alignment film 170 on the pixel array 150 and the opening OP1'. The alignment film 170 is formed through, for example, printing. Specifically, the alignment film 170 includes a first portion 172, a second portion 174, and a third portion 176. The first portion 172 of the alignment film 170 extends and covers the first electrode 52 and the protection layer 160, and is overlapped with the active array 140, the pixel array 150, the protection layer 160, and the buffer layer 130. In addition, the first portion 172 of the alignment film 170 is overlapped with the display region DR and is not overlapped with the transmission region TR. The second portion 174 of the alignment film 170 is located on the portion of the second substrate 120 exposed from the opening OP1'. That is, the second portion 174 of the alignment film 170 is directly in contact with the second substrate 120. In addition, and orthogonal projection of the second portion 174 of the alignment film 170 on the second substrate 120 is overlapped with the transmission region TR. The third portion 176 of the alignment film 170 connects with the first portion 172 and the second portion 174, and the third portion 176 is surrounded by the protection layer 160. That is, the third portion 176 of the alignment film 170 is formed on the sidewall of the opening OP1'. In other words, the alignment film 170 is conformally in contact with the protection layer 160, the second substrate 120, and/or the pixel array 150. Therefore, a distance between the first portion 172 of the alignment film 170 and the second substrate 120 is greater than a distance between the second portion 174 of the alignment film 170 and the second substrate 120. As described above, the active array 140 and the pixel array 150 herein are merely examples. Therefore, a surface of the first portion 172 of the alignment film 170 may be planar, or may be conformal to the layers between the pixel array 150 and the protection layer 160 as illustrated.

Figure 4E:
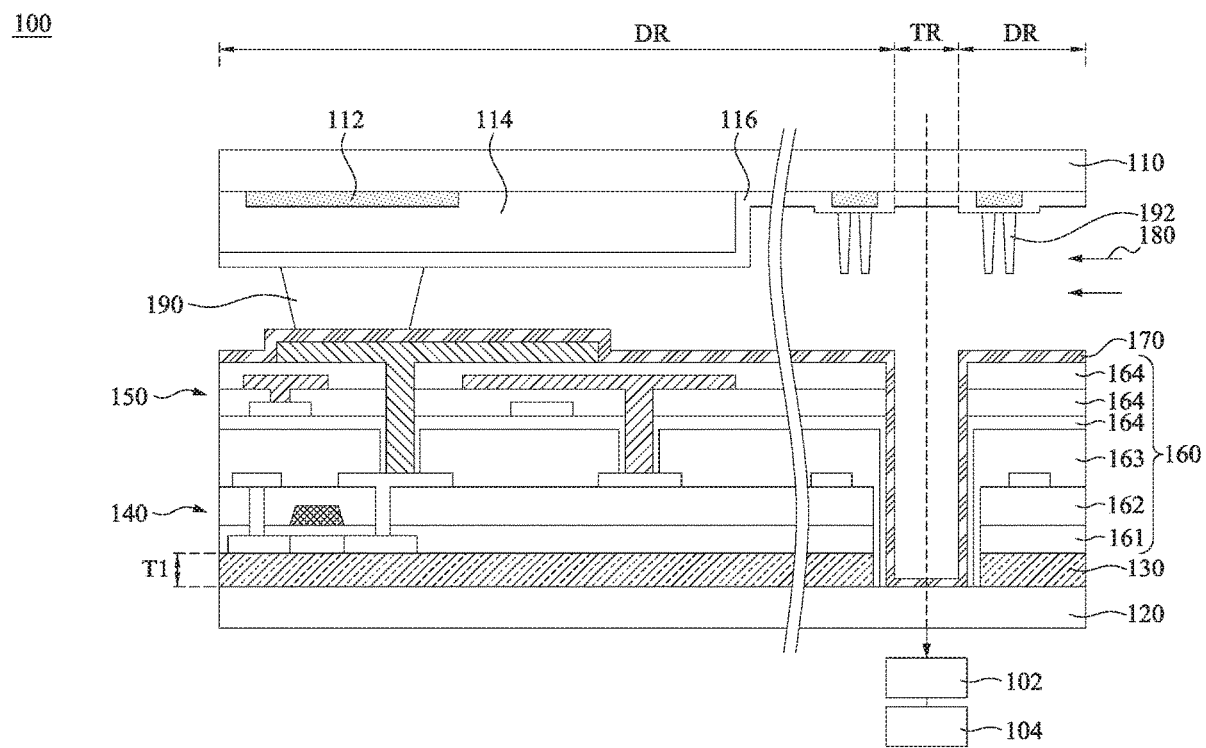

Reference is made to FIG. 4E, is step S14, providing the first substrate 110. The first substrate 110 includes the black matrix 112, a filter layer 114, a protection film 115, and another alignment film (not shown), etc. The electronic device 100 further includes spacers 190, 192 disposed between the first substrate 110 and the second substrate 120 so as to regulate a distance between the first substrate 110 and the second substrate 120. Reference is made to FIG. 4E and FIG. 2 simultaneously. A liquid crystal layer 180 is filled between the first substrate 110 and the second substrate 120. For example, filling of the liquid crystal layer 180 may be performed under vacuum state, and the spacer 192 may prevent the first substrate 110 and the second substrate 120 from bending or collapsing due to pressure difference. The first substrate 110 and the second substrate 120 are fixed by glue so as to achieve the electronic device 100 as shown in FIG. 2. It is noted that, the configuration of the second substrate 120 is merely an example, and the present disclosure is not limited in this regard. For example, in the embodiment shown in FIG. 4, an orthogonal projection of the protection film 116 of the first substrate 110 on the second substrate 120 is overlapped with the transmission region TR. In some other embodiments, the orthogonal projection of the protection film 116 of the first substrate 110 on the second substrate 120 may not be overlapped with the transmission region TR.

According to the structure and fabrication method of the electronic device 100 as shown in FIG. 2, FIG. 3, and FIGS. 4A to 4E, since there is no need to form an opening in the second substrate 120 of the electronic device 100, and there is no need to form the transmission region TR by drilling process, the process of forming the transmission region TR may be integrated with the process of forming the panel. In other words, formation of the laminated structures overlapped with the transmission region TR and formation of the active array 140 and the pixel array 150 may be performed simultaneously, thereby reducing fabrication cost and increasing yield.

Figure 5:
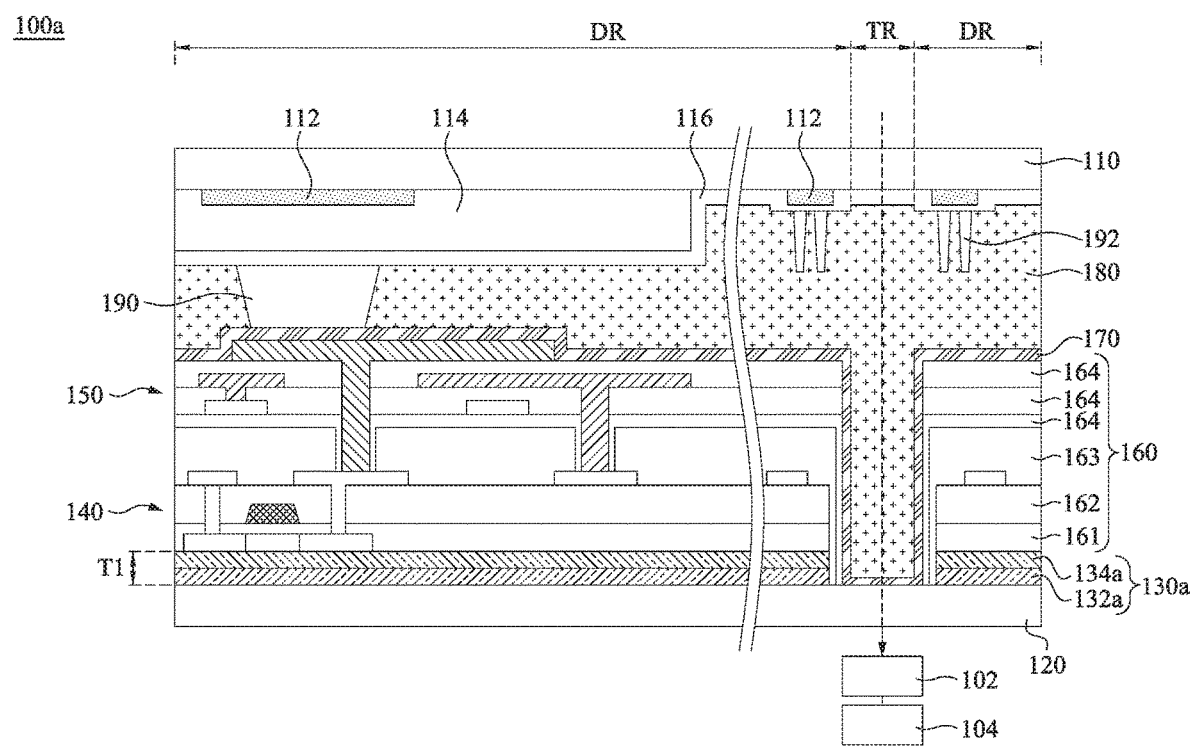
FIG. 5 is a cross-sectional view of a electronic device according to another embodiment of the present disclosure.

FIG. 5 is a cross-sectional view of an electronic device 100a according to another embodiment of the present disclosure. The electronic device 100a is the same as the electronic device 100 shown in FIG. 2, and the difference is that the buffer layer 130a of the electronic device 100a includes a first sub-layer 132a and a second sub-layer 134a. The first sub-layer 132a is disposed on the second substrate 120, and the second sub-layer 134a is disposed on the first sub-layer 132a. For example, the material of the first sub-layer 132a includes silicon nitride, and a thickness is greater than and equal to 500 angstroms and is smaller than and equal to 1350 angstroms. If the thickness of the first sub-layer 132a formed by silicon nitride is smaller than 500 angstroms, it may not be able to efficiently block leakage of other materials in subsequent process. Furthermore, when the amorphous silicon of the semiconductor layer 142 is transformed to multiple silicon in the excimer-laser annealing process, amount of heat produced from the laser remained in the semiconductor layer 142 may affect size of the particle. The electrical property of a transistor is worse if sizes of the particles are smaller. Since the silicon oxide of the second sub-layer 134a has smaller heat transduction coefficient, the second sub-layer 134a may be thicker and has better heat insulation property. Therefore, size of the particle may be greater so as to improve the electrical property of the transistors. For example, if the thickness of the second sub-layer 134a is smaller than 1000 angstroms, the heat insulation efficiency is worse, and sizes of particles may be 5% to 10% smaller than the second sub-layer 134a whose thickness is greater than 1000 angstroms, such that the electrical property may be worse.

It is noted that it is available as long as the thicknesses of the first sub-layer 132a and the second sub-layer 134a are in the ranges as described above, and a total thickness of the buffer layer 130a is substantially greater than and equal to 1500 angstroms and smaller than and equal to 3000 angstroms. In the present embodiment, relative positions of the first sub-layer 132a and the second sub-layer 134a of the buffer layer 130a are not limited. In addition, as described above, the portion of the buffer layer 130a overlapped with the transmission region TR of the first substrate 110 may be completely removed after forming the active array 140 and the pixel array 150, or may be completely removed during any step of forming the active array 140 and the pixel array 150.

Figure 6:
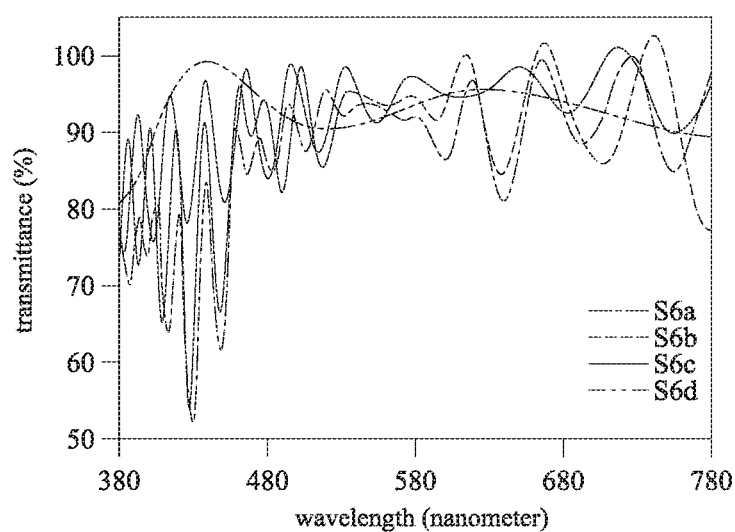
FIG. 6 is a simulation diagram of a transmittance of a light passed different numbers of protection layer according to some embodiments of the present disclosure.

FIG. 6 is a simulation diagram of a transmittance of a light passed different numbers of protection layer according to some embodiments of the present disclosure. Reference is made to FIG. 4 and FIG. 6 simultaneously. The protection layer 160 herein may include the gate insulation layer 161, the interlayer dielectric layer 162, the passivation layer 163, and the insulation layer 164. Wavelengths of visible lights are demonstrated in FIG. 6. For example, transmittance corresponds to wavelengths from 380 nm to 780 nm are illustrated. A curve S6a is a light transmission distribution by simulating a light passing the buffer layer 130, the gate insulation layer 161, the interlayer dielectric layer 162, the passivation layer 163, the insulation layer 164, and the alignment film 170. A curve S6b is a light transmission distribution by simulating a light passing the buffer layer 130, the gate insulation layer 161, the interlayer dielectric layer 162, the passivation layer 163, and the alignment film 170. A curve S6c is a light transmission distribution by simulating a light passing the buffer layer 130, the passivation layer 163, and the alignment film 170. A curve S6d is a light transmission distribution by simulating a light passing the buffer layer 130 and the alignment film 170. As shown in Figures, fewer types of mediums the light has passed, less transmittance difference is caused due to deviation of light transmission property and light absorb property of different medium. In addition, when types of mediums the light has passed is fewer, the light transmittances corresponds to various wavelengths have a tendency to increase. For example, the transmittances correspond to the curve S6a and the curve S6b are located in a range from about 50% to 100%, while the transmittance corresponds to the curve S6c is located in a range from about 70% to 100%. The transmittance corresponds to the curve S6d is located in a range from about 80% to 100%.

Figure 7:
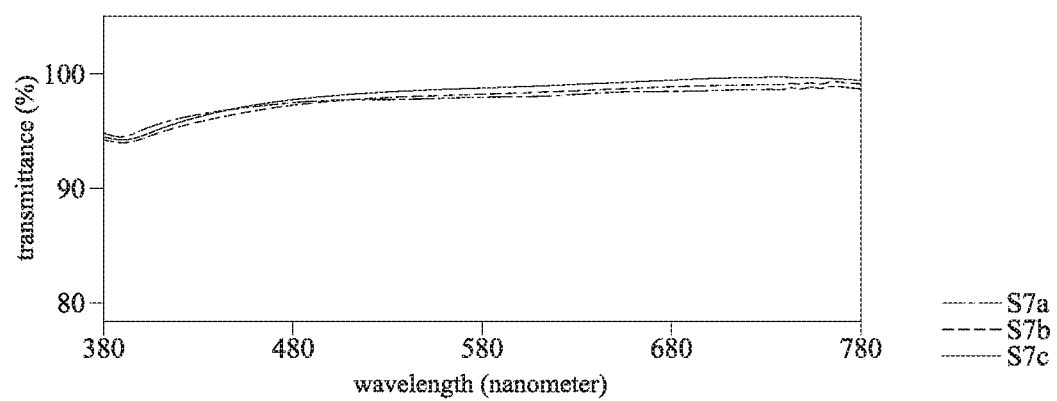
FIG. 7 is a simulation diagram of a transmittance of the embodiment in FIG. 2.

FIG. 7 is a simulation diagram of a transmittance of the embodiment in FIG. 2. Wavelengths of visible lights are demonstrated in FIG. 7. For example, transmittance corresponds to wavelengths from 380 nm to 780 nm are illustrated. Reference is made to FIG. 2 and FIG. 7 simultaneously. According to processes described above in FIGS. 4A to 4E, the light received by the imaging element 102 of the electronic device 100 and/or the sensor 104 sequentially passes the first substrate 110, the second portion 174 of the alignment film 170, and the first substrate 110. As shown in FIG. 7, a curve S7a, a curve S7b, a curve S7c respectively represent a second portion 174 (see FIG. 4D) of the alignment film 170 of the electronic device 100 with thickness 500 angstroms, 700 angstroms, and 900 angstroms. According to FIG. 7, values of the light transmittance corresponds to different wavelengths are close. That is, the difference of the light transmittance is small. Accordingly, the thickness of the alignment film 170 does not affect the light transmittance significantly. In addition, the light transmittances are all greater than 90%, for example, located in a range from about 93% to 100%. Therefore, during the processes of forming the active array 140 and the pixel array 150, the light transmittance at the transmission region TR can be enhanced and the difference of the light transmittance can be reduced merely by removing the portions of the buffer layer 130 and the protection layer 160 overlapped with the transmission region TR. That is, the forming method of the alignment film 170 is not required to be modified. As such, the light receiving quality of the imaging element 102 of the electronic device 100a can be enhanced and/or the sensing efficiency of the sensor 104 of the electronic device 100a can be enhanced.

Figure 8:
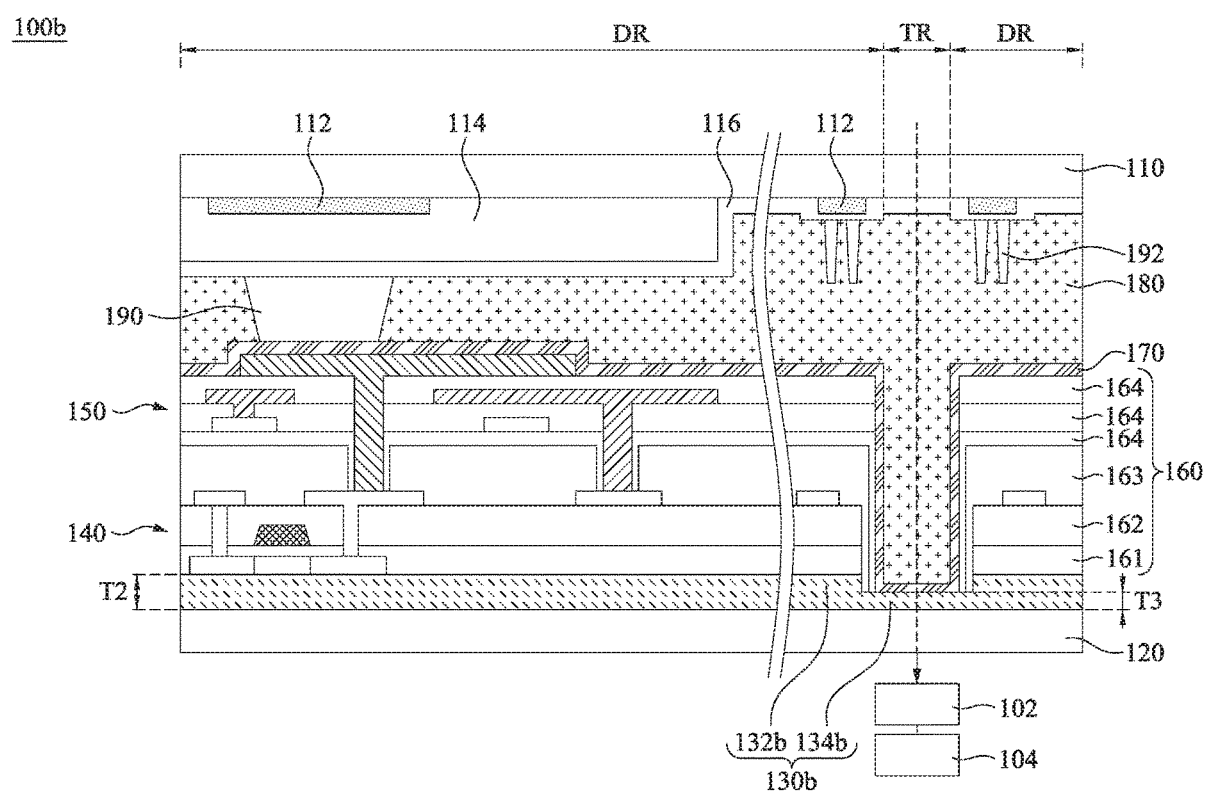
FIG. 8 is a cross-sectional view of an electronic device according to another embodiment of the present disclosure.

FIG. 8 is a cross-sectional view of an electronic device 100b according to another embodiment of the present disclosure. The electronic device 100b has a cross-sectional position the same as that of the electronic device 100. The electronic device 100b is substantially the same as the electronic device 100 shown in FIG. 2, the difference is that the buffer layer 130b of the electronic device 100b has a first portion 132b and a second portion 134 that are connected to each other. A projection of the first portion 132b on the second substrate 120 is overlapped with the display region DR. A projection of the second portion 134b on the second substrate 120 is overlapped with the transmission region TR. A thickness T3 of the second portion 134b is smaller than a thickness T2 of the first portion 132b. The first portion 132b and the second portion 134b are formed as a single piece. The second portion 174 of the alignment film 170 is in contact with the second portion 134b of the buffer layer 130b. The second portion 134b of the buffer layer 130b is located between the second substrate 120 and the second portion 174 of the alignment film 170. That is, the alignment film 170 of the electronic device 100b is conformally in contact with the buffer layer 130b, the protection layer 160, and/or the pixel array 150.

In one embodiment, a refractive index of the material of the buffer layer 130b of the electronic device 100b is greater than 1.48 and is smaller than 1.6, and an extinction coefficient of the buffer layer 130b is greater than 0 and is smaller than 10-3. For example, in the present embodiment, the material of the buffer layer 130b is silicon oxide, and the thickness T2 of the buffer layer 130b may be greater than 3000 angstroms, but the present disclosure is not limited in this regard. Specifically, the thickness T2 of the buffer layer 130b is not limited, it is required that the refractive index and the extinction coefficient of the buffer layer 130b satisfy the criteria describe.

Figure 9:
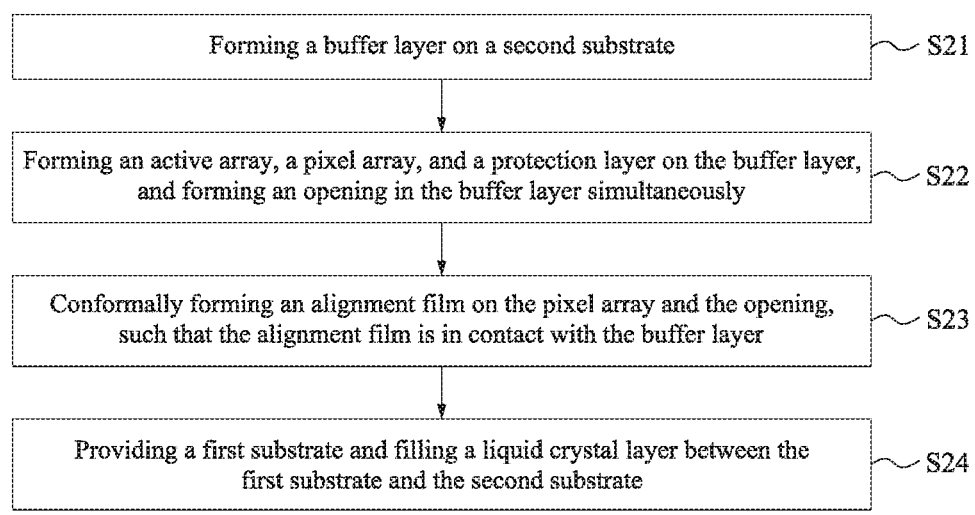
FIG. 9 is a flow chart of a fabrication method of the electronic device in FIG. 8.
Figure 10A:
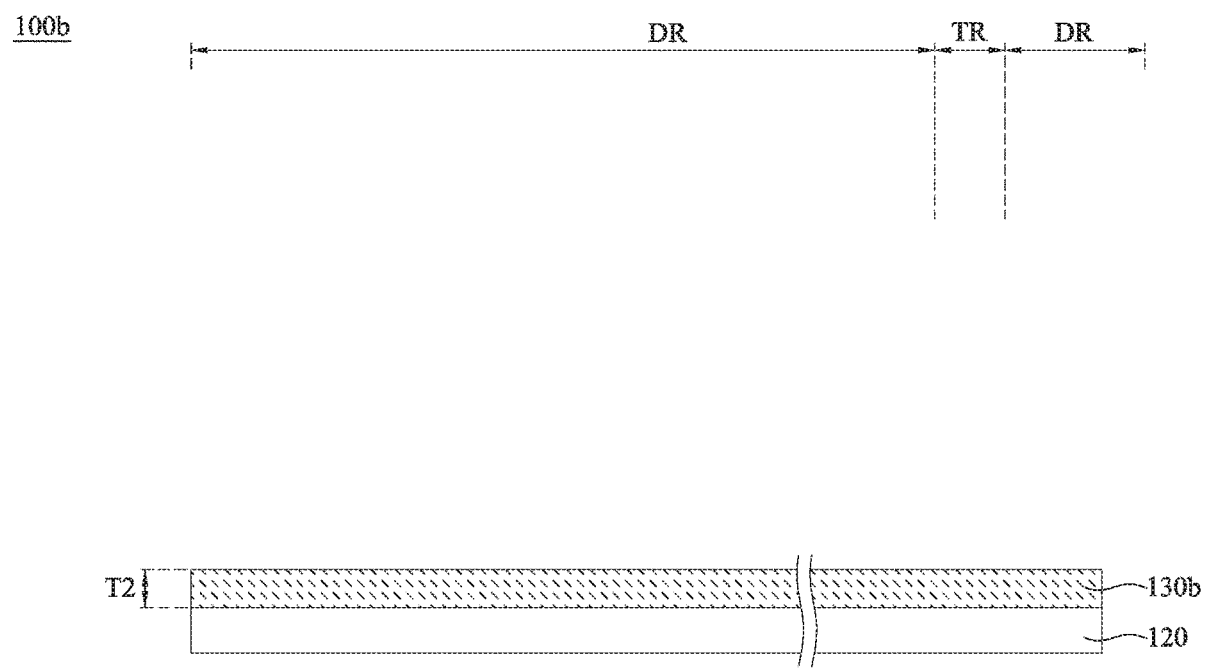
FIGS. 10A to 10E are cross-sectional views of different stages of the fabrication method of the electronic device in FIG. 8.

FIG. 9 is a flow chart of a fabrication method of the electronic device 100b in FIG. 8. FIGS. 10A to 10E are cross-sectional views of different stages of the fabrication method of the electronic device 100b in FIG. 8. The electronic device 100b shown in FIGS. 10A to 10E has a cross-sectional position the same as that of the electronic device 100 shown in FIG. 2. The fabrication process of the electronic device 100b is substantially the same as the fabrication process shown in FIGS. 4A to 4E, and a description of those similar steps is not repeated hereinafter. Reference is made to FIG. 9 and FIG. 10A first. In step S21, the second substrate 120 is formed, and the buffer layer 130b is formed on the second substrate 120. The buffer layer 130b extends to cover the display region DR and the transmission region TR. In the present embodiment, the thickness T2 of the buffer layer 130b is greater than 3000 angstroms, and it may adjust according to practical fabrication condition. A refractive index of the material of the buffer layer 130b of the electronic device 100b is greater than 1.48 and is smaller than 1.6, and an extinction coefficient of the buffer layer 130b is greater than 0 and is smaller than $10^{-3}$.

Figure 10B:
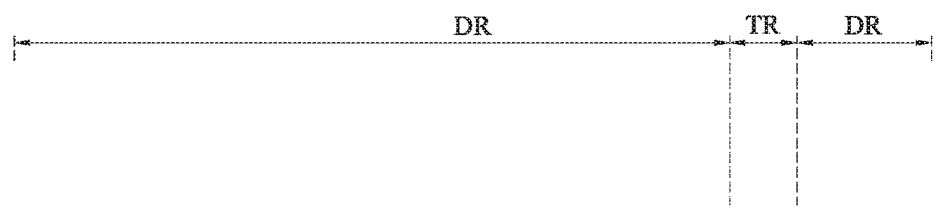
Figure 10B:
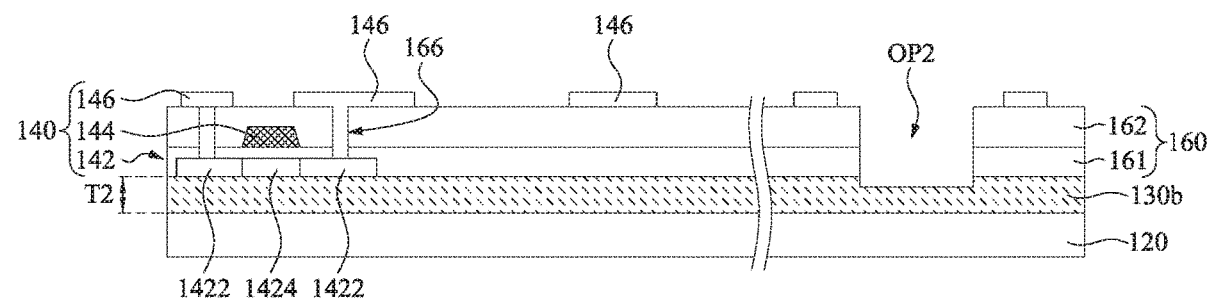
Figure 10C:
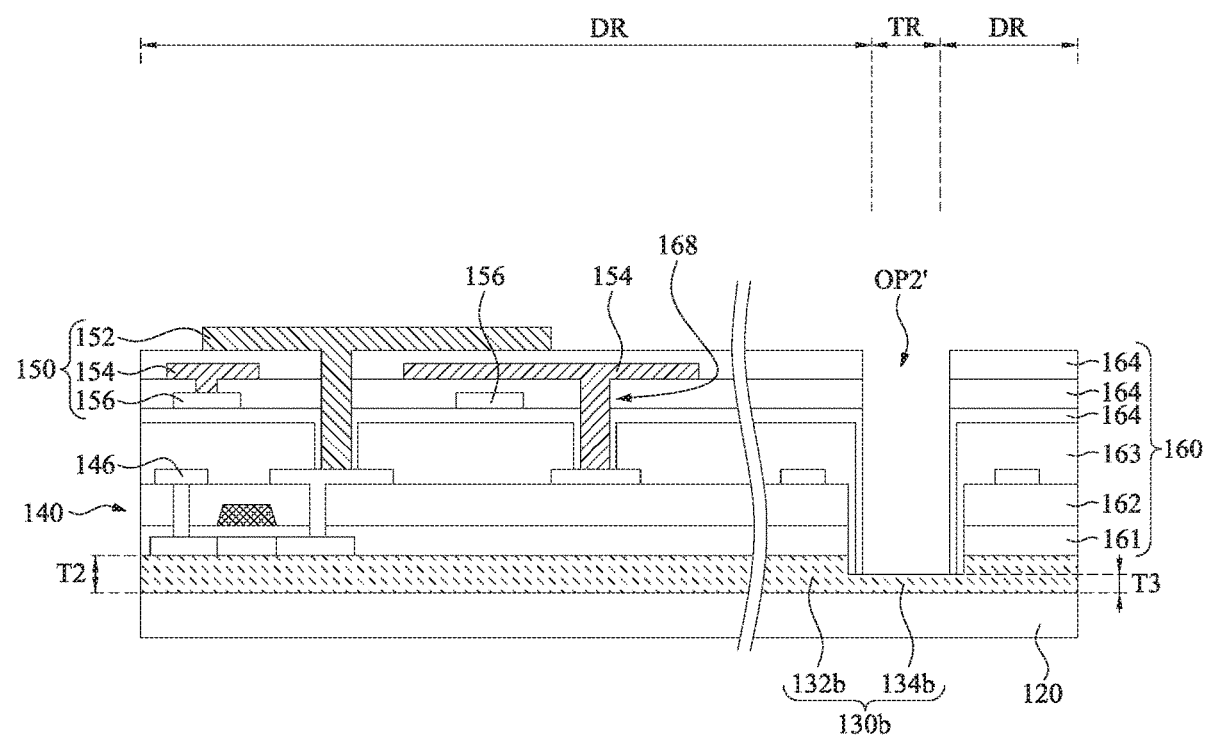

Reference is made to FIG. 9 and FIG. 10B simultaneously. In step S22, the active array 140, the protection layer 160, and the pixel array 150 are formed on the buffer layer 130b, and an opening is formed in the buffer layer 130b simultaneously such that a portion of the buffer layer 130b is located between the opening and the second substrate 120. The fabrication process of the active array 140 is substantially the same as the description in step shown in FIG. 4B. That is, forming the opening OP2 in the buffer layer 130b, the gate insulation layer 161, and the interlayer dielectric layer 162 during the process of forming the active array 140 simultaneously. In the subsequent steps, laminated structures of the transmission region TR as shown in FIG. 8 is formed in the opening OP2. The opening OP2 is substantially the same as the opening OP1 of the electronic device 100. Since the thickness T2 of the buffer layer 130b is greater, the volume of the buffer layer 130b occupied by the opening OP2 is smaller. That is, a thickness of the remaining portion of the buffer layer 130b overlapped with the transmission region TR as shown in FIG. 10B is thicker.

Reference is made to FIG. 9 and FIG. 100. The pixel array 150 is formed on the buffer layer 130b and the protection layer 160. The fabrication process of the pixel array 150 is substantially the same as the description in step shown in FIG. 4C. That is, forming the opening OP2' in the buffer layer 130b, the gate insulation layer 161, and the interlayer dielectric layer 162 during the process of forming the pixel array 150 simultaneously. However, in the present embodiment, the second substrate 120 is not exposed from the opening OP2'. In other words, the remaining portion of the buffer layer 130b overlapped with the transmission region TR is the second portion 134b, and the second substrate 120 is covered by the second portion 134b of the buffer layer 130b. In other words, since the thickness T2 of the buffer layer 130b is not limited, the opening OP2' may penetrate the protection layer 160 and a portion of the buffer layer 130b.

According to the description of step 22, since the opening OP2, OP2' are formed during fabrication process of forming the active array 140 and the pixel array 150 simultaneously, there is no need to increase numbers of the photomask and the process step.

Figure 10D:
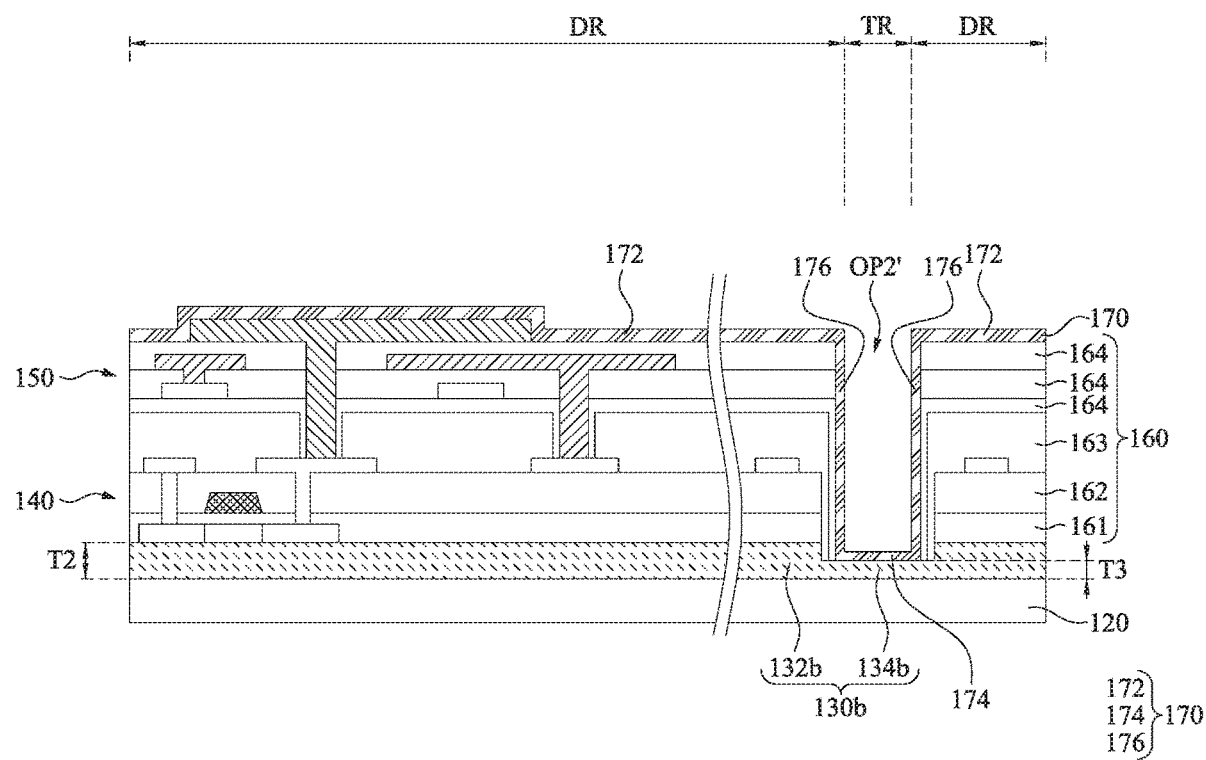

Reference is made to FIG. 9 and FIG. 10D, in step S23, the alignment film 170 is conformally formed on the pixel array 150 and the opening OP2'. The fabrication process of the alignment film 170 is substantially the same as the description in step shown in FIG. 4D, the difference is that the second portion 174 of the alignment film 170 is on the second portion 134b of the buffer layer 130b. That is, the second portion 174 of the alignment film 170 is directly in contact with the second portion 134b of the buffer layer 130b. In other words, the alignment film 170 is conformally in contact with the protection layer 160, the second portion 134b of the buffer layer 130b, and/or the pixel array 150. A distance between the first portion 172 of the alignment film 170 and the second substrate 120 is still greater than a distance between the second portion 174 of the alignment film 170 and the second substrate. In the present embodiment, the distance between the second portion 174 of the alignment film 170 and the second substrate 120 is substantially equal to the thickness of the second portion 134b of the buffer layer 130b.

Figure 10E:
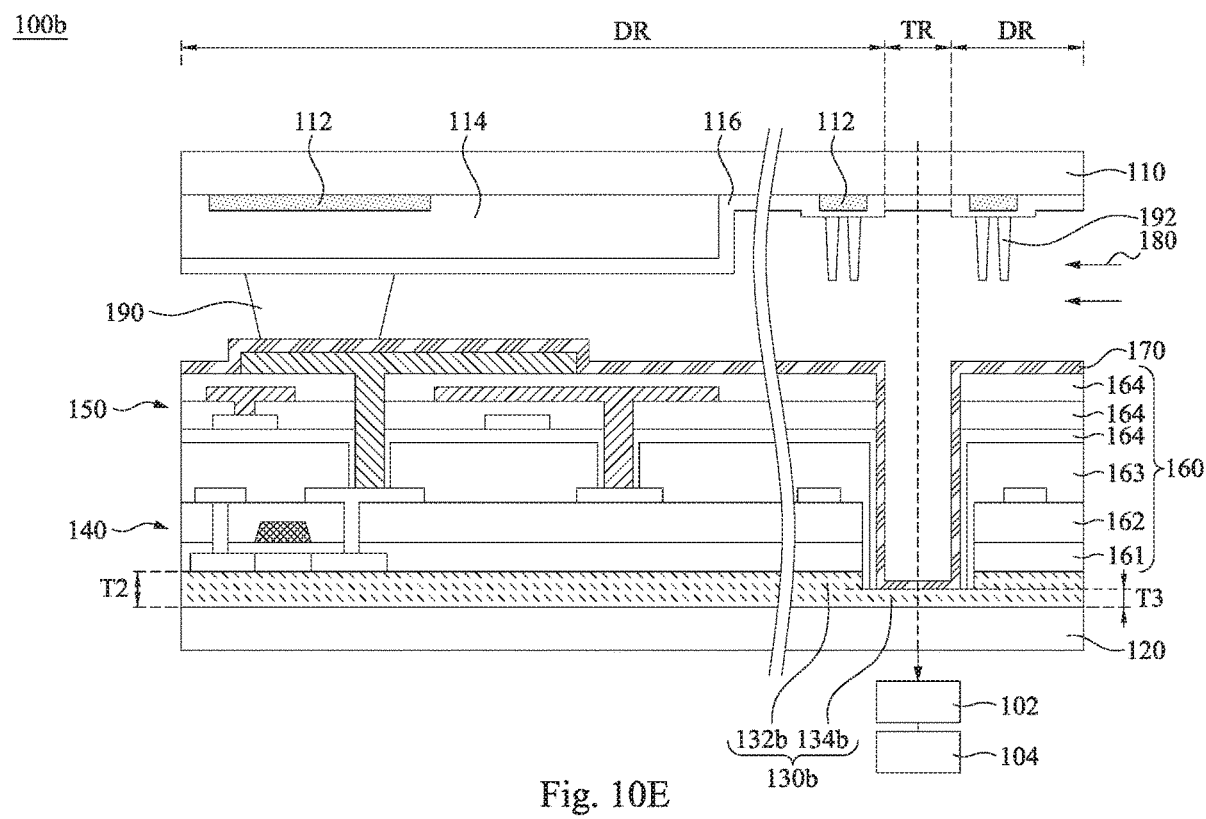

Reference is made to FIG. 9 and FIG. 10E, in step S24, the first substrate 110 is formed, and the crystal liquid layer 180 is filled between the first substrate 110 and the second substrate 120. The fabrication process of the first substrate 110 is substantially the same as the description in step shown in FIG. 4E. Therefore, the description is not repeated hereinafter.

According to the fabrication method of the electronic device 100b shown in FIG. 8, FIG. 9, and FIGS. 10A to 10E, since there is no need to form opening in the second substrate 120 of the electronic device 100b (i.e., no glass drilling process is needed to formed the transmission region TR), the formation of the transmission region TR can be integrated with the formation of the active array. In other words, formation of the laminated structures overlapped with the transmission region TR and formation of the active array 140 and the pixel array 150 may be performed simultaneously, thereby reducing fabrication cost and increasing yield.

Figure 11A:
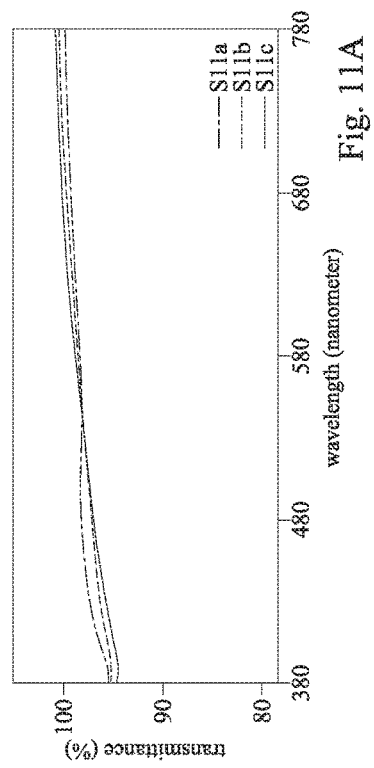
FIGS. 11A to 11C are simulation diagrams of a transmittance according to some embodiments of the present disclosure.
Figure 11B:
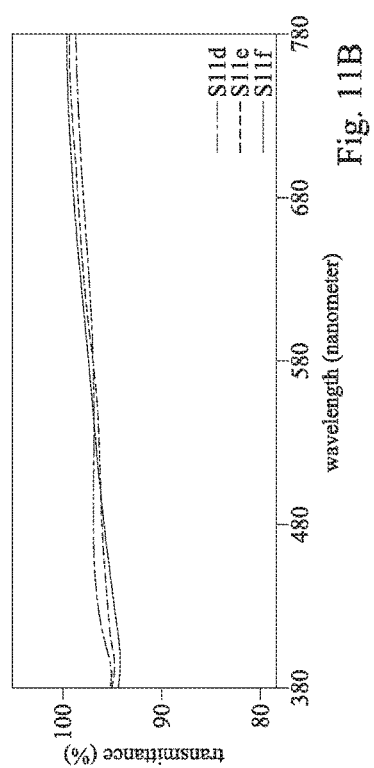
Figure 11C:
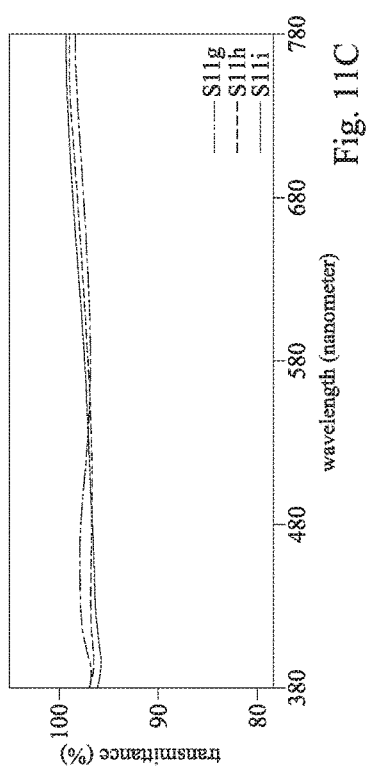

FIGS. 11A to 11C are simulation diagrams of a transmittance according to some embodiments of the present disclosure. FIGS. 11A to 11C are simulation diagrams of transmittance corresponding to the electronic devices 100b of which the alignment film 170 and the buffer layer 130b having various thickness. As shown by the data in FIG. 7, the thickness of the alignment film 170 has no significant influence to the light transmittance. Therefore, the light output efficiency of the electronic device 100b is demonstrated through the simulation diagrams of the light transmittance. Those simulation diagrams correspond to the light transmittance of the lights respectively passing the alignment film 170 with thickness of 500 angstroms, 700 angstroms, and 900 angstroms and passing the buffer layer 130b with various thicknesses. The refractive index of the material of the buffer layer 130b is substantially equal to 1.484, and the extinction coefficient of the buffer layer 130b is almost zero. As shown in FIG. 11A, a curve S11a, a curve S11b, and a curve S11c respectively represent the light passed the alignment film 170 of which the thickness is 500 angstroms and passed the buffer layers 130b of which the thicknesses are respectively 1000 angstroms, 1200 angstroms, and 1400 angstroms. As shown in FIG. 11B, a curve S11d, a curve S11e, and a curve S11f respectively represent the light passed the alignment film 170 of which the thickness is 700 angstroms and passed the buffer layers 130b of which the thicknesses are respectively 800 angstroms, 1000 angstroms, and 1200 angstroms. As shown in FIG. 11C, a curve S11g, a curve S11h, and a curve S11i respectively represent the light passed the alignment film 170 of which the thickness is 900 angstroms and passed the buffer layers 130b of which the thicknesses are respectively 600 angstroms, 800 angstroms, and 1000 angstroms. According to FIGS. 11A, 11B, and 11C, light transmittances are all greater than 90% and the light transmittances corresponds to different wavelengths are close to each other. That is, the difference of the light transmittance is small.

Figure 12A:
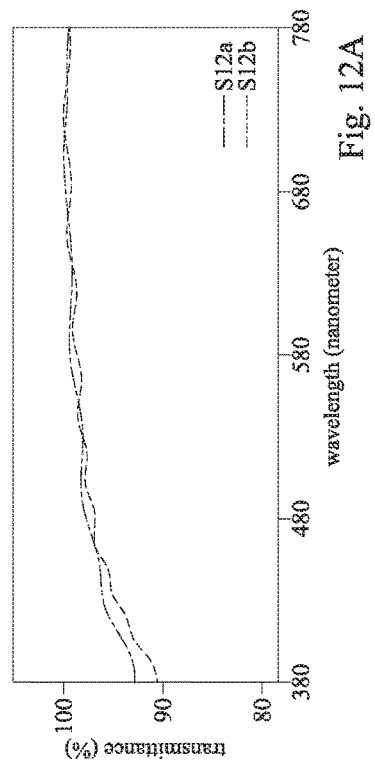
FIGS. 12A to 12C are simulation diagrams of a transmittance according to some embodiments of the present disclosure.
Figure 12B:
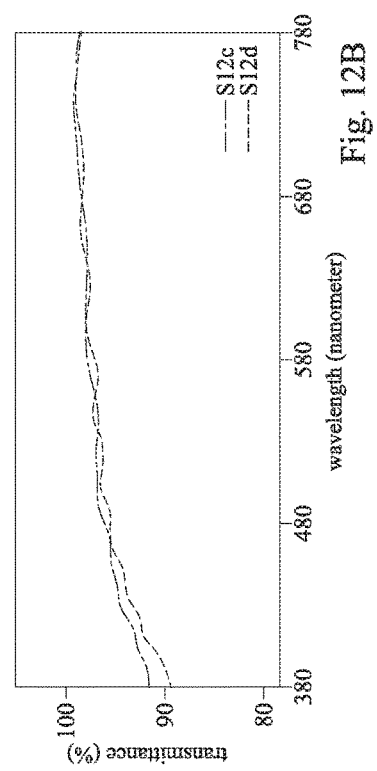
Figure 12C:
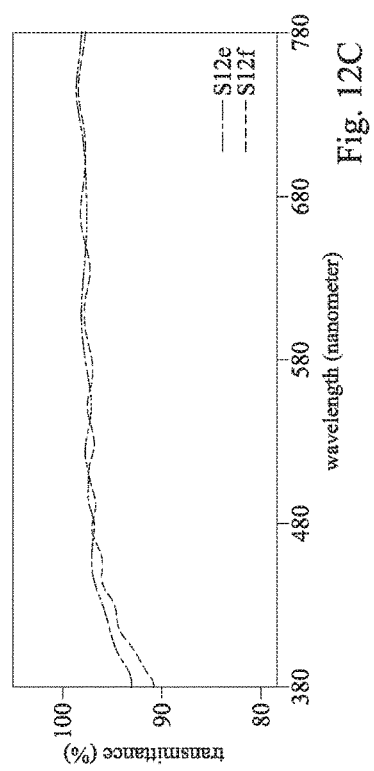

FIGS. 12A to 12C are simulation diagrams of a transmittance according to some embodiments of the present disclosure. FIGS. 12A to 12C are simulation diagrams of transmittance corresponding to the electronic devices 100b of which the alignment film 170 and the buffer layer 130b having various thickness. The light output efficiency of the electronic device 100b is demonstrated through the simulation diagrams of the light transmittance. Those simulation diagrams correspond to the light transmittance of the lights respectively passing the alignment film 170 with thickness of 400 angstroms, 700 angstroms, and 1000 angstroms and passing the buffer layer 130b with various thicknesses. The refractive index of the material of the buffer layer 130b is greater than 1.515, and the extinction coefficient of the buffer layer 130b is greater than 8.6e-5. As shown in FIG. 12A, a curve S12a and a curve S12b respectively represent the light passed the alignment film 170 of which the thickness is 400 angstroms and passed the buffer layers 130b of which the thicknesses are respectively 10000 angstroms and 20000 angstroms. As shown in FIG. 12B, a curve S11c and a curve S11d respectively represent the light passed the alignment film 170 of which the thickness is 700 angstrom and passed the buffer layers 130b of which the thicknesses are respectively 10000 angstroms and 200000 angstroms. As shown in FIG. 11C, a curve S11e and a curve S11f respectively represent the light passed the alignment film 170 of which the thickness is 1000 angstroms and passed the buffer layers 130b of which the thicknesses are respectively 10000 angstroms and 20000 angstroms. According to FIGS. 12A, 12B, and 12C, light transmittances are located in a range from about 90% to 100%, and the light transmittances corresponds to different wavelengths are close to each other. That is, the difference of the light transmittance is small.

As described in the description about the electronic device 100*b*, by choosing the refractive index and extinction coefficient of the material of the buffer layer 130*b* that satisfy the criteria, the portion of the buffer layer 130*b* overlapped with the transmission region TR is not required to be removed completely after the pixel array 150 and the active array 140 are formed, and the second portion 134*b* of the buffer layer 130*b* may be remained. In other words, as long as the refractive index of the material of the buffer layer 130*b* is greater than 1.48 and is smaller than 1.6, and the extinction coefficient of the material of the buffer layer 130*b* is greater than zero and is smaller than $10^{-3}$, the thickness T2 of the buffer layer 130*b* is not limited. In addition, the light transmittance of the transmission region TR may be enhanced and the difference of the light transmittance may be reduced, thereby enhancing the light receiving quality of the imaging element 102 of the electronic device 100*b* and the sensing efficiency of the sensor 104 of the electronic device 100*b*.

Figure 13:
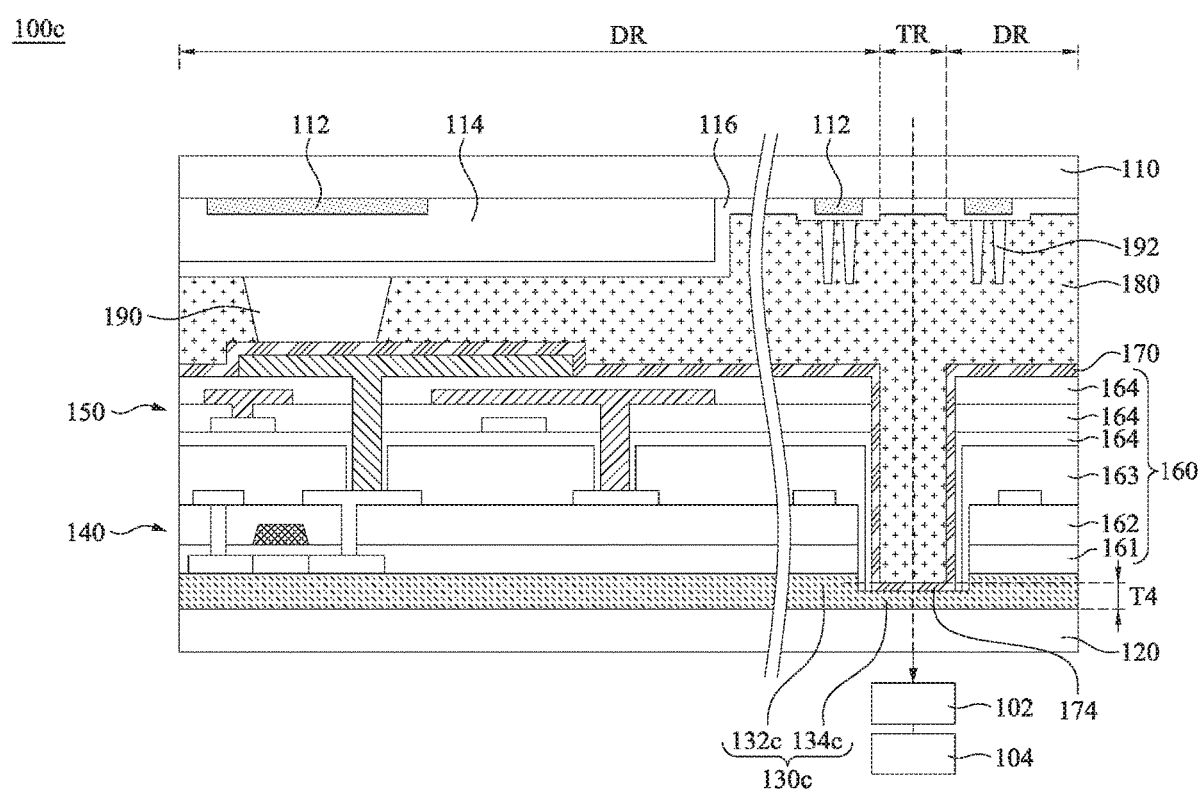
FIG. 13 is a cross-sectional view of an electronic device according to another embodiment of the present disclosure.

FIG. 13 is a cross-sectional view of an electronic device 100*c* according to another embodiment of the present disclosure. The electronic device 100*c* is the same as the electronic device 100*b* shown in FIG. 8, the difference is that the refractive index and extinction coefficient of the material of the buffer layer 130*c* are not limited, and a total thickness T4 of the second portion 134*c* of the buffer layer 130*c* and the second portion 174 of the alignment film 170 is required to be greater than and equal to 500 angstroms and is smaller than and equal to 1000 angstroms. In other words, the refractive index of the material of the buffer layer 130*c* is not required to be greater than 1.48 and smaller than 1.6. The extinction coefficient of the material of the buffer layer 130*c* is not required to be greater than zero and smaller than $10^{-3}$. That is, the refractive index of the buffer layer 130*c* may be greater than 1.6, and the extinction coefficient of the buffer layer 130*c* may be greater than $10^{-3}$. The material of the buffer layer 130*c* may be any material that is suitable for forming the buffer layer. The thickness of the second portion 134*c* of the buffer layer 130*c* may be achieved by adjusting parameters of depositing process. For example, in some embodiments, the thickness of the alignment film 170 formed by printing may be in a range from about 500 angstroms to 900 angstroms. Therefore, the thickness of the second portion 134*c* of the buffer layer 130*c* may be in a range from about 100 angstroms to 500 angstroms. In some embodiments, the thickness of the alignment film 170 may be in a range from about 600 angstroms to 700 angstroms. Therefore, the thickness of the second portion 134*c* of the buffer layer 130*c* may be in a range from about 300 angstroms to 400 angstroms.

FIGS. 14A to 14D are simulation diagrams of a transmittance according to some embodiments of the present disclosure. FIGS. 14A to 14D are simulation diagrams of transmittance corresponding to the electronic devices 100*c* of which the alignment film 170 and the buffer layer 130*c* having various thickness. The light output efficiency of the electronic device 100*c* is demonstrated through the simulation diagrams of the light transmittance. Those simulation diagrams correspond to the light transmittance of the lights respectively passing the alignment film 170 with thickness of 700 angstroms, 600 angstroms, and 500 angstroms and passing the buffer layer 130*c* with various thicknesses. The refractive index of the material of the buffer layer 130*c* is substantially equal to 1.868, and the extinction coefficient of the buffer layer 130*c* is close to 3.5e-3.

Figure 14A:
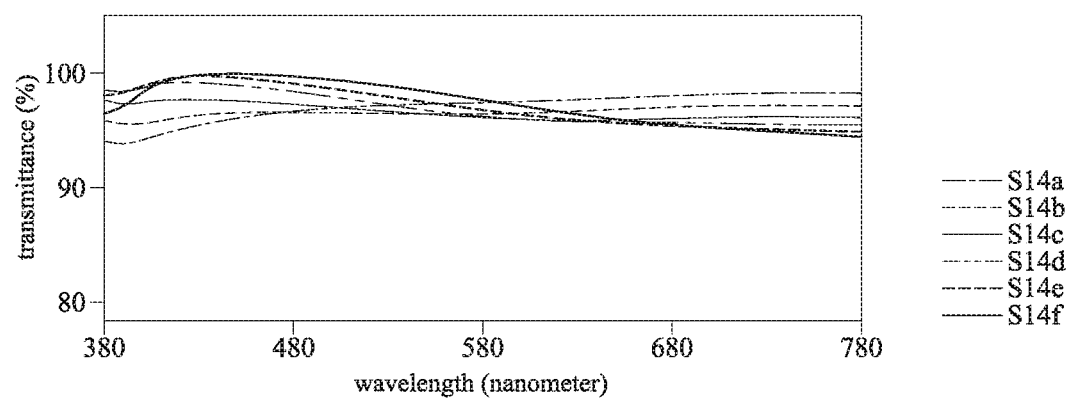
FIGS. 14A to 14D are simulation diagrams of a transmittance according to some embodiments of the present disclosure.

As shown in FIG. 14A, a curve S14*a*, a curve S14*b*, a curve S14*c*, a curve S14*d*, a curve S14*e*, and a curve S14*f* respectively represent the light passed the alignment film 170 of which the thickness is 700 angstroms and passed the buffer layers 130*c* of which the thicknesses are respectively 0 angstroms, 100 angstroms, 200 angstroms, 300 angstroms, 400 angstroms, and 500 angstroms. According to FIG. 14A, when the thickness of the buffer layer 130*c* increases, a difference of the transmittance corresponds to different wavelengths has a tendency to increase. Specifically, the curve S14*f* and the curve S14*e* corresponds to embodiments of which the total thickness T4 of the alignment film 170 and the second portion 134*c* of the buffer layer 130*c* are respectively about 1100 angstroms and 1200 angstroms. The transmittance demonstrated by the curve S14*f* and the curve S14*e* has an amplitude of about 5% to 10% corresponds to a range of the wavelength from about 380 nanometers to about 580 nanometers. The curve S14*a*, the curve S14*b*, the curve S14C, and the curve S14*d* correspond to embodiments of which the total thickness T4 of the alignment film 170 and the second portion 134*c* of the buffer layer 130*c* are respectively 700 angstroms, 800 angstroms, 900 angstroms, 1000 angstroms. The transmittance demonstrated by the curve S14*a*, the curve S14*b*, the curve S14*c*, and the curve S14*d* are gradually increasing or decreasing. In other words, when the total thickness T4 of the alignment film 170 and the second portion 134*c* of the buffer layer 130*c* are smaller than or equal to 1000 angstroms, the light transmittance is located in a range from about 90% to 100%, and the difference of the light transmittance is small.

Figure 14B:
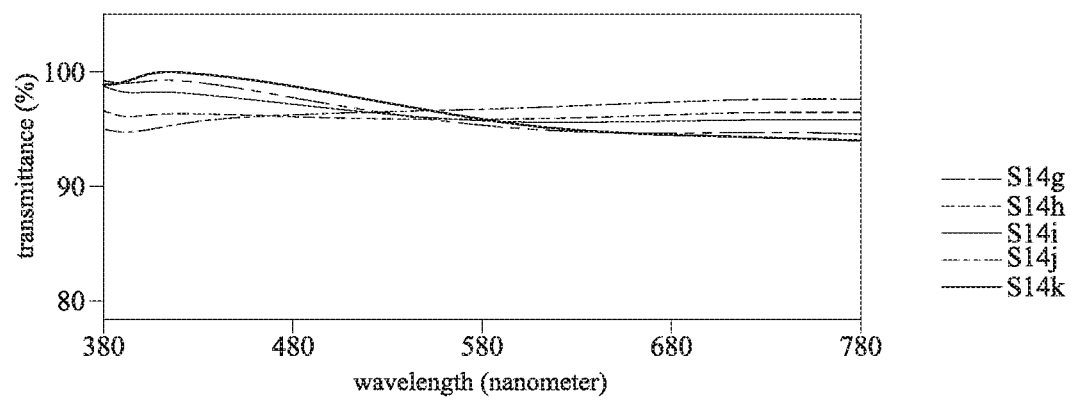

As shown in FIG. 14B, a curve S14*g*, a curve S14*h*, a curve S14*i*, a curve S14*j*, and a curve S14*k* respectively represent the light passed the alignment film 170 of which the thickness is 600 angstroms and passed the buffer layers 130*c* of which the thicknesses are respectively 100 angstroms, 200 angstroms, 300 angstroms, 400 angstroms, and 500 angstroms. Similar to those described in FIG. 14A, the curve S14*k* corresponds to an embodiment of which the total thickness T4 of the alignment film 170 and the second portion 134*c* of the buffer layer 130*c* is about 1100 angstroms. Therefore, the difference of the light transmittance of the embodiment demonstrated by the curve S14K is greater. The curve S14*g*, the curve S14*h*, the curve S14*i*, and the curve S14*j* respectively correspond to embodiments of which the total thickness T4 of the alignment film 170 and the second portion 134*c* of the buffer layer 130*c* are about 700 angstroms, 800 angstroms, 900 angstroms, and 1000 angstroms. Therefore, the light transmittances are located in a range from 90% to 100%, and the difference of the light transmittance is small.

Figure 14C:
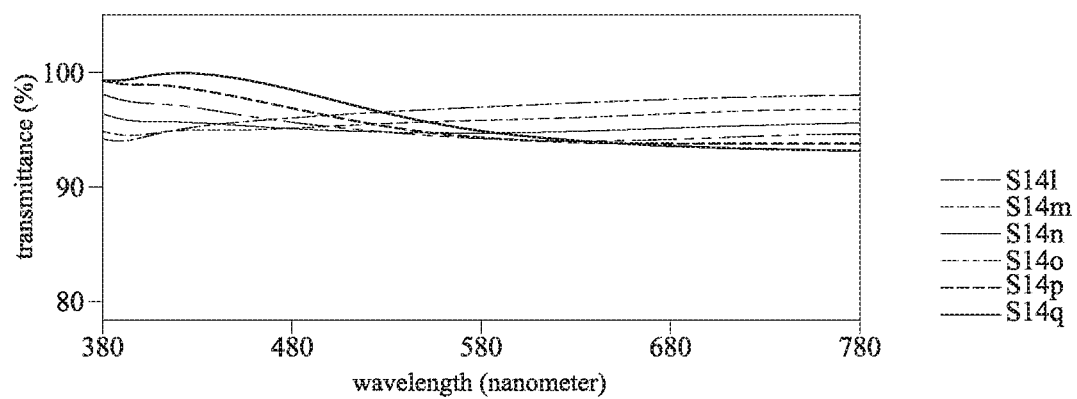

As shown in FIG. 14C, a curve S14*l*, a curve S14*m*, a curve S14*n*, a curve S14*o*, a curve S14*p*, and a curve S14*q* respectively represent the light passed the alignment film 170 of which the thickness is 500 angstroms and passed the buffer layers 130*c* of which the thicknesses are respectively 100 angstroms, 200 angstroms, 300 angstroms, 400 angstroms, 500 angstroms, and 600 angstroms. Similar to those described in FIG. 14A, the curve S14*q* corresponds to an embodiment of which the total thickness T4 of the alignment film 170 and the second portion 134*c* of the buffer layer 130*c* is about 1100 angstroms. Therefore, the difference of the light transmittance of the embodiment demonstrated by the curve S14K is greater. The curve S14*l*, the curve S14*m*, the curve S14*n*, and the curve S14*o*, and the curve S14*p* respectively correspond to embodiments of which the total thickness T4 of the alignment film 170 and the second portion 134*c* of the buffer layer 130*c* are about 600 angstroms, 700 angstroms, 800 angstroms, 900 angstroms, and 1000 angstroms. Therefore, the light transmittances are located in a range from 90% to 100%, and the difference of the light transmittance is small.

Figure 14D:
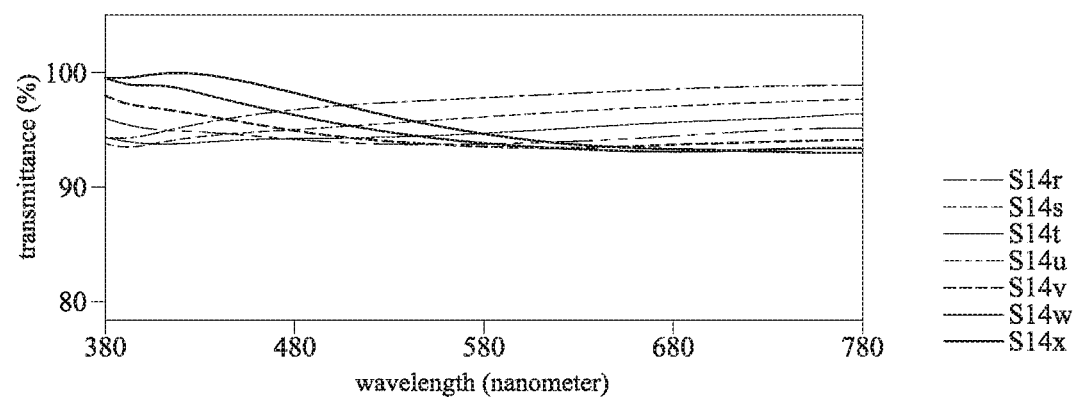

As shown in FIG. 14D, a curve S14r, a curve S14s, a curve S14t, a curve S14u, a curve S14v, a curve S14w, and a curve S14x respectively represent the light passed the alignment film 170 of which the thickness is 400 angstroms and passed the buffer layers 130c of which the thicknesses are respectively 100 angstroms, 200 angstroms, 300 angstroms, 400 angstroms, 500 angstroms, 600 angstroms, and 700 angstroms.

Similar to those described in FIG. 14A, the curve S14x corresponds to an embodiment of which the total thickness T4 of the alignment film 170 and the second portion 134c of the buffer layer 130c is about 1100 angstroms. Therefore, the difference of the light transmittance of the embodiment demonstrated by the curve S14x is greater. The curve S14r, the curve S14s, the curve S14t, and the curve S14u, the curve S14v, and the curve S14w respectively correspond to embodiments of which the total thickness T4 of the alignment film 170 and the second portion 134c of the buffer layer 130c are about 500 angstroms, 600 angstroms, 700 angstroms, 800 angstroms, 900 angstroms, and 1000 angstroms. Therefore, the light transmittances are located in a range from 90% to 100%, and the difference of the light transmittance is small.

As described above, through the design of the laminated structures in the transmission region TR, the projection of the protection layer 160 on the second substrate 120 can be spaced apart from the transmission region TR. In addition, the portion of the buffer layer of which the projection on the second substrate 120 is overlapped with the transmission region TR is completely removed (e.g., the buffer layer 130 in FIG. 2) or partially removed (e.g., the buffer layer 130a in FIG. 8, the buffer layer 130b in FIG. 9. Therefore, the light transmittance of the transmission region TR may be enhanced and the difference of the light transmittance may be reduced, and the light emitting quality and efficiency of the lens of the electronic device may be improved.

Furthermore, since there is no need to form the transmission region TR by drilling process, the process of forming the transmission region TR may be integrated with the process of forming the panel. Therefore, the fabrication cost may be reduced and the yield may be increased.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic device, comprising:
   a first substrate comprising a transmitting region, a display region, and a periphery region, wherein the periphery region surrounds the display region, and the display region surrounds the transmission region;
   a second substrate disposed opposite to the first substrate;
   a buffer layer disposed on the second substrate;
   a protection layer disposed on the buffer layer, and a projection of the protection layer on the second substrate is apart from the transmitting region;
   an active array disposed on the buffer layer;
   a pixel array disposed on the active array and electrically connected to the active array; and
   an alignment film conformally disposed on the protection layer, the buffer layer, and the second substrate, and in direct contact with the second substrate in the transmitting region.

2. The electronic device of claim 1, wherein the alignment film comprises a first portion and a second portion, wherein a projection of the first portion on the second substrate is overlapped with the display region, a projection of the second portion on the second substrate is overlapped with the transmitting region, and a distance between the first portion and the second substrate is greater than a distance between the second portion and the second substrate.

3. The electronic device of claim 1, wherein a projection of the buffer layer on the second substrate is apart from the transmitting region.

4. The electronic device of claim 1, wherein a thickness of the buffer layer is greater than 1500 angstroms and is smaller than and equal to 3000 angstroms.

5. The electronic device of claim 4, wherein the buffer layer further comprises:
   a first sub-layer having a thickness greater than and equal to 500 angstrom and is smaller than and equal to 1350 angstrom, wherein a material of the first sub-layer comprises silicon nitride; and
   a second sub-layer having a thickness greater than and equal to 1000 angstrom and is smaller than and equal to 1650 angstrom, wherein a material of the second sub-layer comprises silicon oxide.

6. The electronic device of claim 1, further comprising an imaging element facing the second substrate, wherein an orthogonal of the imaging element on the second substrate is overlapped with the transmitting region.

7. The electronic device of claim 1, further comprising a sensor facing the second substrate, and an orthogonal of the sensor on the second substrate is overlapped with the transmitting region.

8. The electronic device of claim 1, further comprising a spacer disposed between the first substrate and the second substrate, wherein the spacer is directly proximal to the transmitting region.

* * * * *